(No Model.)  2 Sheets—Sheet 1.
W. H. CRAWFORD.
APPARATUS FOR OPERATING CHURNS, &c.
No. 537,564. Patented Apr. 16, 1895.
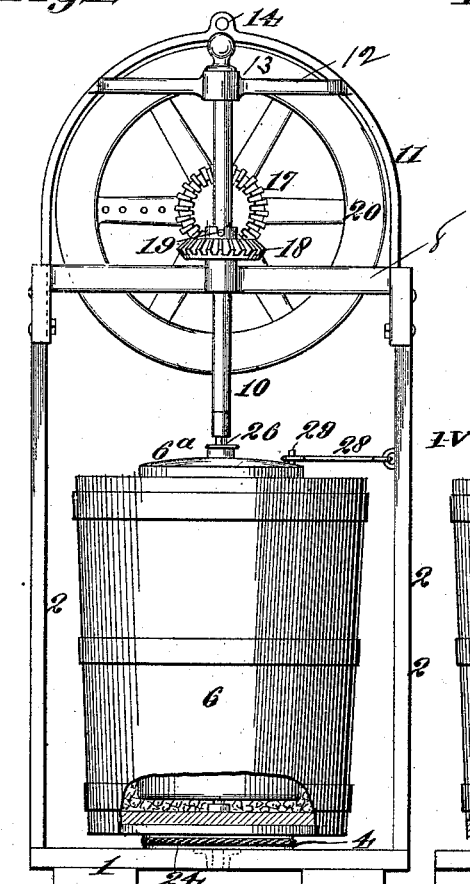
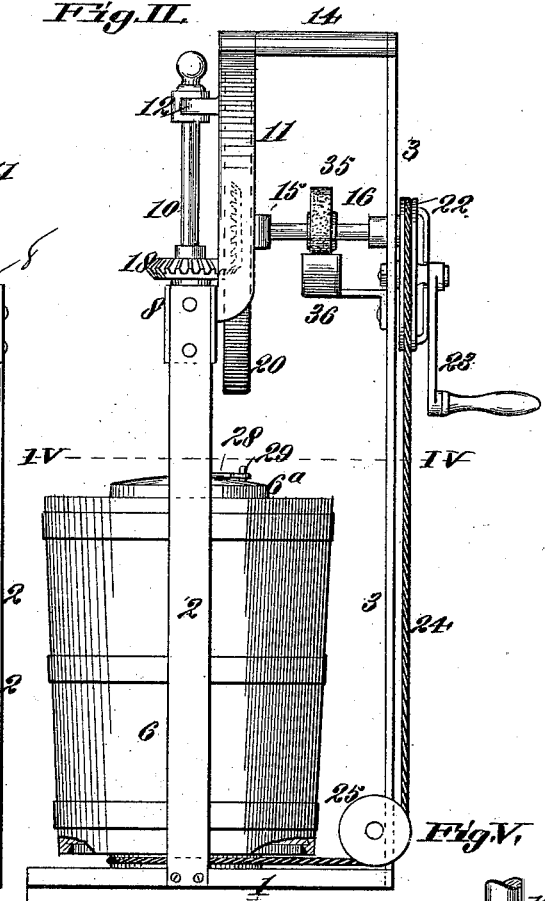
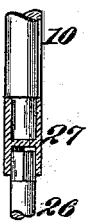
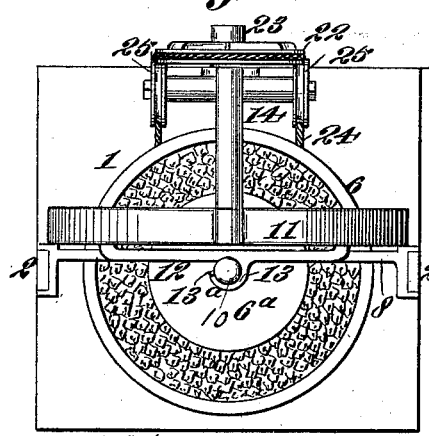
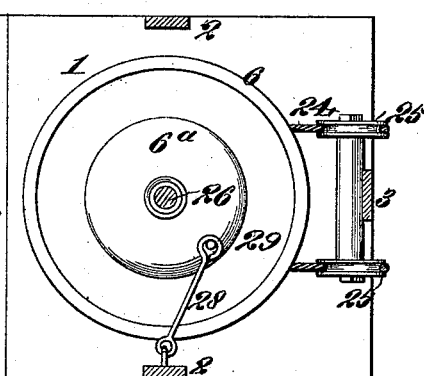
Attest:
E. S. Knight
C. G. Edwards
Inventor:
William H. Crawford
By Knight Bro.
attys
THE NORRIS PETERS CO., PHOTO-LITHO., WASHINGTON, D. C.

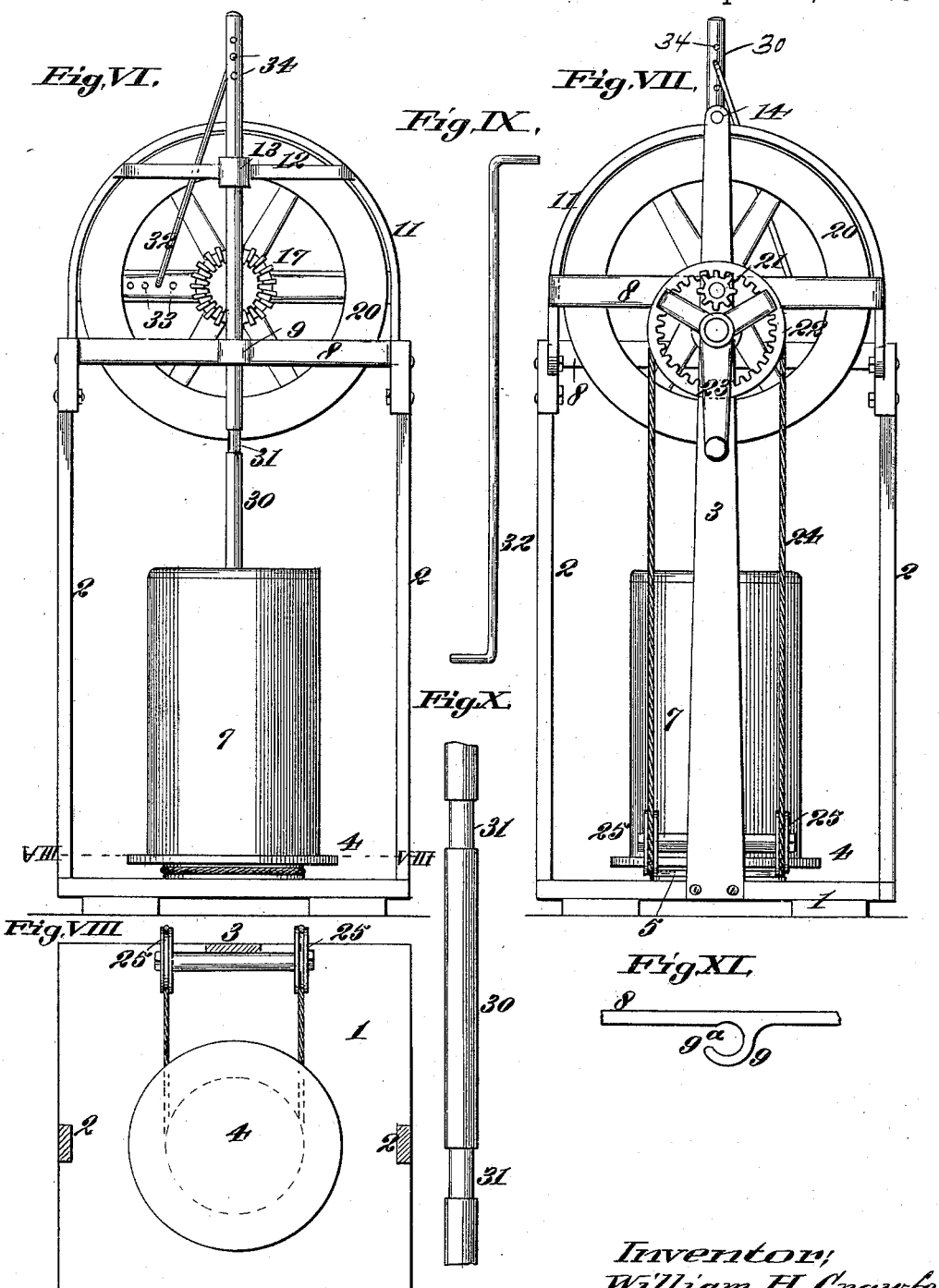

UNITED STATES PATENT OFFICE.

WILLIAM H. CRAWFORD, OF WEATHERFORD, TEXAS.

APPARATUS FOR OPERATING CHURNS, &c.

SPECIFICATION forming part of Letters Patent No. 537,564, dated April 16, 1895.

Application filed July 18, 1894. Serial No. 517,860. (No model.)

*To all whom it may concern:*

Be it known that I, WILLIAM H. CRAWFORD, of Weatherford, in the county of Parker and State of Texas, have invented a certain new and useful Improvement in Apparatus for Operating Churns or Ice-Cream Freezers, of which the following is a full, clear, and exact description, reference being had to the accompanying drawings, forming part of this specification.

My invention relates to an apparatus capable of use in operating either a churn, ice cream freezer or other like vessel, the object of the invention being to produce an apparatus in which there is simultaneously given to the vessel a revolving motion and a revolving or vibrating motion to the agitator working in the vessel, the invention consisting in features of novelty and details of construction hereinafter fully described and pointed out in the claim.

Figure I is a side elevation illustrating the device when employed as a freezer. Fig. II is a front elevation of the arrangement shown in Fig. I. Fig. III is a top view showing the freezer in use. Fig. IV is a horizontal section taken on line IV—IV, Fig. II. Fig. V is a detail view of the lower end of the operating shaft and of the upper end of the freezer shaft, and showing in vertical section the coupling by which the two shafts are connected. Fig. VI is a side elevation of the device when used as a churn. Fig. VII is a side elevation taken from the opposite side from that shown in Fig. VI. Fig. VIII is a horizontal section taken on line VIII—VIII, Fig. VI, looking downward. Fig. IX is a detail view of the pitman rod employed for connecting the fly wheel and the dasher-stem when the device is used as a churn. Fig. X is a detail view of the churn dasher stem and illustrating the reduced portions of the stem, which allow it to be inserted through the side of openings formed in boxes, on the cross bars. Fig. XI is a detail, top view of a portion of one of the cross bars showing the openings in which the churn dasher stem works.

Referring to the drawings, 1 represents the base of the apparatus to which are secured the posts 2, 2, and 3. Pivoted to the base 1 is a horizontal pulley 4 provided with a groove 5, in which an operating cord is adapted to run. The freezer ice box 6, or the churn 7 or any other device desired to be operated, is supported upon and turns with the pulley 4 in the operation of the apparatus.

The main features of the device are employed with any device operated, but there are minor details that are not universally employed. Hence I will first describe the apparatus in connection with an ice cream freezer and afterward the movement of the apparatus when used as a churn.

Secured to the upper ends of the posts or uprights 2 is a cross-bar 8 provided with a box 9 in which an operating shaft 10 works, the said box being provided with an opening $9^a$ the use of which will be hereinafter described and it is clearly shown in Fig. XI. Extending upward from cross-bar 8 is an arch 11 on which is a cross-bar 12 provided with a box 13 in which the upper end of the operating shaft 10 works, the said box having an opening $13^a$ (see Fig. III) similar to the one in the side of the box 9.

The post or upright 3 is of corresponding height to the arch 11 and is connected to the arch by means of a bolt 14. Journaled in the post 3, and in a cross-bar 15 on the arch 11 is a horizontal shaft 16 provided at one end with a bevel pinion 17 that engages with a bevel pinion 18, removably connected with the operating shaft 10 by means of a pin 19 on the operating shaft (see Fig. I), which arrangement allows of the pinion 18 and operating shaft being disconnected.

On the horizontal shaft 16 is a fly wheel 20 and on the opposite end of the horizontal shaft from that on which the bevel pinion 17 is carried is a pinion 21 (clearly seen in Fig. VII) which pinion is operated by an internally toothed wheel 22 provided with a crank handle 23. The rim of the wheel 22 is provided with a groove on its outer surface adapted to receive an endless cord 24, which said cord passes downward over grooved pulleys 25 and thence around the pulley 4 beneath the vessel operated. The operating shaft 10 is connected to the freezer agitator shaft 26 by means of a coupling 27 so that on the turning of the crank handle 23, the agitator is operated by the intermediate pinions on the shaft 16, engaging with the bevel pinion 18 on the operating shaft.

To prevent the cream can 6 from turning with the agitator when the cream becomes stiff from freezing, I employ a link 28 connected at one end to one of the uprights 2, which fits over a pin 29 on the cover of the cream can.

As the wheel 22 is turned to operate the agitator it also operates the cord 24 which cord passing around the pulley 4 causes said pulley to be revolved and to revolve the vessel resting upon it.

When the device is to be employed for operating a churn, the operating shaft and the bevel pinion 18 are removed, and the churn dasher stem 30 is connected to the frame of the apparatus by passing the reduced portions 31 of the dasher stem through the openings $9^a$ and $13^a$ in the side of the boxes 9 and 13 of the cross bars 8 and 12.

32 represents a pitman rod connected to the fly wheel 20 by passing one of its bent ends through openings 33 in one of the legs of the spider of the fly wheel, and connected to the dasher stem by passing its opposite bent end through one of the openings 34 in the upper end of said dasher stem.

It will be seen that upon turning the crank-handle 23, which turns the internally toothed wheel 22 connected with the pinion 21 on the horizontal shaft 16, and with it the fly wheel 20, the pitman rod 32 is carried around with the fly-wheel and in its movement raises and lowers the dasher-stem to agitate the cream in the churn. In the operation of the churn, it will be understood that the working of the cord 24 and pulley 4 is the same as that described with the freezer, the churn being continually revolved on the pulley as the dasher-stem is raised and lowered to agitate the contents of the churn.

Mounted on the horizontal shaft 16 is a grinding wheel 35 beneath which is a trough 36 for containing water, connected to the upright 3.

I claim as my invention—

The combination of the base 1, the uprights 2, the post 3, the lower cross-bar 8 secured to the uprights, the frame 11, extending up from the lower cross-bar, and having an upper cross-bar 12 at its upper end, the bolt 14 connecting the post with the frame, the horizontal grooved wheel 4 mounted on the base, the intermediate cross-bar 15, the horizontal shaft 16 journaled in the post and in the intermediate cross-bar, the fly-wheel 20 and the pinion 21 mounted on the horizontal shaft, the internally toothed grooved wheel 22 meshing with the pinion, and having a crank-handle, the grooved pulleys 25 mounted at the base, the endless cord 24 passed around the horizontal wheel, under the pulleys and around the internally toothed wheel, and means for connecting the machinery with the device to be operated; substantially as described.

WILLIAM H. CRAWFORD.

In presence of—
C. G. EDWARDS,
E. S. KNIGHT.